No. 671,660. Patented Apr. 9, 1901.
R. W. SCHMELZ.
ELECTRICALLY OPERATED FAN.
(Application filed Nov. 6, 1900.)
(No Model.)
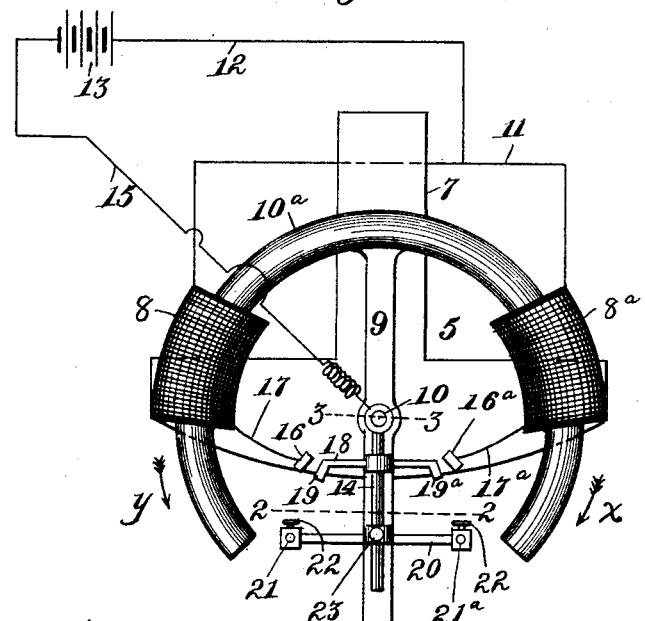
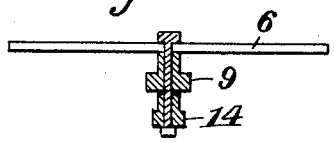
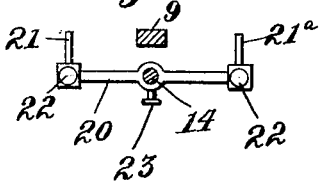
WITNESSES:
INVENTOR
Richard W. Schmelz
BY
ATTORNEYS

UNITED STATES PATENT OFFICE.

RICHARD W. SCHMELZ, OF BROOKLYN, NEW YORK.

ELECTRICALLY-OPERATED FAN.

SPECIFICATION forming part of Letters Patent No. 671,660, dated April 9, 1901.

Application filed November 6, 1900. Serial No. 35,668. (No model.)

*To all whom it may concern:*

Be it known that I, RICHARD W. SCHMELZ, a citizen of the United States, residing at Brooklyn, in the county of Kings and State of New York, have invented certain new and useful Improvements in Electrically-Operated Fans, of which the following is a full and complete specification, such as will enable those skilled in the art to which it appertains to make and use the same.

This invention relates to electrically-operated fans; and the object thereof is to provide an improved fan of this class which is adapted to be suspended from a ceiling or other overhead support and which is simple in construction and operation and comparatively inexpensive; and with this and other objects in view the invention consists in an electrically-operated fan and fan mechanism constructed as hereinafter described and claimed.

The invention is fully disclosed in the following specification, of which the accompanying drawings form a part, in which the separate parts of my improvement are designated by the same reference characters in each of the views, and in which—

Figure 1 is a side view of my improved fan-operating mechanism; Fig. 2, a cross-section on the line 2 2 of Fig. 1, and Fig. 3 a cross-section on the line 3 3 of Fig. 1.

In the practice of my invention I provide a T-shaped support 5, consisting of a cross-head 6 and a vertical plate or bar 7, connected therewith centrally thereof, said device being adapted to be connected with a ceiling or other overhead support, and connected with the opposite ends of the cross-head 6 of the support 5 in any desired manner are two solenoids 8 and $8^a$, which are spool-shaped in form. I also provide a rod or bar 9, pivotally connected with the cross-head 6 of the support 5 and centrally thereof, as shown at 10, and said rod or bar 9 is adapted to swing in a vertical plane on its pivotal support and is provided at its upper end with a segmental head $10^a$, the opposite sides of which pass through the solenoids 8 and $8^a$, and the segmental head 10 of the rod or bar 9 is composed of iron or other suitable conductor of electricity, and the rod or bar 9 may be composed of any desired material and may be formed integrally with or connected with the segmental head 10 in any desired manner.

Connected with both of the solenoids 8 and $8^a$ is a wire 11, with which is connected another wire 12, which is in connection with a battery 13, which battery is also in connection with a switch-bar 14 by means of a wire 15, and the switch-bar 14 is pivoted on the pivotal support of the rod or bar 9 at 10 and is adapted to swing thereon, and said switch-bar 14 is in practice insulated from its pivotal support and also from the rod or bar 9.

Placed between the solenoids 8 and $8^a$ and the rod or bar 9 and connected with the cross-head 6 of the support 5 are contact posts or devices 16 and $16^a$, which are connected to the solenoids 8 and $8^a$ by wires 17 and $17^a$, and the switch-bar 14 is provided with an armature 18, the ends of which are formed into contact devices 19 and $19^a$, which are adapted to operate in connection with the contact devices or posts 16 and $16^a$, and secured to the switch-bar 14 at a predetermined distance below the armature 18 is a supplemented cross-bar or cross-head 20, provided at its ends with backwardly-directed pins 21 and $21^a$, and said pins are adjustable on the cross-bar or cross-head 20 by means of set-screws 22, and the cross-bar or cross-head 20 is adjustable on the switch-bar 14 by means of a set-screw 23.

A fan 24 of any desired form or construction is connected with the lower end of the rod or bar 9, and the operation will be readily understood from the foregoing description when taken in connection with the accompanying drawings and the following statement thereof.

It will be understood that when an electric current is passed through one of the solenoids 8 or $8^a$ the said solenoid is actuated and draws the center of the segmental head 10 of the rod or bar 9, which operates as an armature, in the direction of said solenoid, and said head or armature swings through said solenoids, and by constantly switching the current from one of said solenoids to another the rod or bar 9 will be caused to swing in a vertical plane, thus operating the fan 24. In order to start the apparatus, the lower end of the rod or bar 9 is swung by hand in one direction— say toward the solenoid 8. In this movement the head or armature 10 swings through the solenoids 8 and 8ª in the direction of the arrow $x$, and as the lower end or lower portion of the rod or bar 9 strikes the pin 21 of the cross-bar 20 the switch-bar 14 is moved also in the direction of the solenoid 8, and the end 19 of the armature 18 strikes the contact device 16, and a current is at once established through the solenoid 8. This draws the armature or head 10 in the direction of the arrow $y$, and the fan 24 is swung in the opposite direction, and in this operation the end 19ª of the armature 18 strikes the contact device or post 16ª, which operation at once establishes a circuit through the solenoid 8ª, and the head or armature 10 is swung in the direction of the arrow $x$, which operation moves the lower end of the rod or bar 9 and the fan 24 in the opposite direction, and the making or breaking of the circuit through the opposite solenoids is thus continued indefinitely.

In practice the switch-bar 14 is pivoted in such manner that it will not swing independently or loosely, but must be operated either by the electric current, as hereinbefore described, or by moving the rod or bar 9 by hand, and the distance between the ends of the armature 18 and the contact posts or devices 16 and 16ª is very slight.

This device is simple in construction and operation and perfectly adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. An electrically-operated fan apparatus, comprising a suitable support, two solenoids connected therewith at opposite points, a fan-rod pivotally suspended between said solenoids, and provided at its upper end with a segmental armature-head which passes through said solenoids, a switch-bar pivotally suspended from said rod between said solenoids, and provided with an armature arranged transversely thereof, and below said armature with a cross-bar, having backwardly-directed pins or stops, contact devices connected with said support between the switch-bar armature and said solenoids, and in electrical connection with said solenoids, said switch-bar and said solenoids being also in electrical connection with a battery, substantially as shown and described.

2. In an electrically-operated fan apparatus, a support, two solenoids connected therewith at opposite points, a fan-rod pivotally suspended between said solenoids, and provided with a segmental armature-head which passes through said solenoids, a switch-bar pivotally suspended from said fan-rod between said solenoids, and provided with an armature arranged transversely thereof, contact devices arranged between said armature and said solenoids, and a cross-bar connected with the switch-bar below the armature thereon, and provided with projecting pins or stops, substantially as shown and described.

3. In an apparatus of the class described, a support, two solenoids connected therewith at opposite points, a fan-rod pivotally supported between said solenoids, and provided with a segmental armature-head which passes through said solenoids, contact devices connected with said support between said solenoids, and a switch device pivotally suspended from the fan-rod, and between said solenoids, and adapted to be operated by the fan-rod, substantially as shown and described.

In testimony that I claim the foregoing as my invention I have signed my name, in presence of the subscribing witnesses, this 3d day of November, 1900.

RICHARD W. SCHMELZ.

Witnesses:
F. A. STEWART,
M. K. LOWERRE.